United States Patent Office 2,825,716
Patented Mar. 4, 1958

2,825,716

POLYMERS AND COPOLYMERS OF N-(AMINO-1,2,4-TRIAZOLYL) IMIDES OF ALKYL-1,2-DIOIC ACIDS

Gaetano F. D'Alelio, Pittsburgh, Pa., assignor to Koppers Company, Inc., a corporation of Delaware No Drawing. Application June 26, 1953
Serial No. 364,511

18 Claims. (Cl. 260—78)

This invention relates to new monomers and to new polymeric materials derived therefrom and is particularly directed to the polymerization products obtained by polymerizing a mass comprising as a new monomer an imide of a diamino-1,2,4-triazole and maleic or citraconic acid and a copolymerizable compound especially acrylonitrile. The invention also relates to compositions of these polymerization products adapted to the formation of shaped articles, in many cases to molecularly oriented shaped articles, particularly to fibers, threads, bristles, mono-filaments, etc., hereinafter referred to as fibers, and other shaped articles such as films and the like, which articles show improved dyeing properties.

It has been known for sometime that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C. or upon spinning from hot solutions. Such crosslinking causes spoliation of material by gelation during storage, embrittlement of fibers, fouling of spinning jets, and other production difficulties.

In accordance with the present invention it has now been found that improvements in dyeing properties of acrylonitrile polymers are obtained by the polymerization of monomeric masses comprising acrylonitrile and an imide of a diamino-1,2,4-triazole and maleic or citaconic acid with or without other copolymerizable ethylenic compounds. It has been found further that in addition to the fact that the imides of diamino-1,2,4-triazoles and maleic or citraconic acids yield particularly valuable copolymers with acrylonitrile, they may also be used effectively to form copolymers with other types of copolymerizable ethylenic compounds having a CH$_2$=C< group. Thus it has been found that valuable polymerization products may be prepared in accordance with the invention by polymerizing a monomeric mass comprising an imide of a diamino-1,2,4-triazole and maleic or citraconic acid and a polymerizable compound such as acrylonitrile and the other polymerizable ethylenic compounds listed hereinafter.

The imides of diamino-1,2,4-triazoles and maleic or citraconic acids of this invention may be represented by the formula

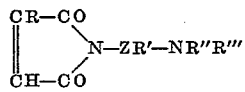

in which R is hydrogen or the methyl group; Z is the 1,2,4-triazole nucleus

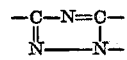

and R' is hydrogen or an alkyl, aryl, aralkyl, alkaryl, or cycloaliphatic group; and R'' and R''' are hydrogen, an acyl group or an alkyl, aryl, aralkyl, alkaryl or cycloaliphatic group or together form the diacyl radical of maleic or citraconic acid, provided that no more than one of the groups R'' and R''' is an acyl group. Thus one or more of the radicals R', R'', R''' may be methyl, ethyl, isopropyl, n-butyl, sec-butyl, amyl, hexyl, decyl, phenyl, tolyl, naphthyl, benzyl, phenethyl, cyclohexyl, cyclopentyl, and the like. One of the radicals R'' and R''' may also be acyl such as formyl, acetyl, propionyl, butyryl, benzoyl, etc, or together may form the diacyl radical of maleic or citraconic acid. The acyl groups advantageously are the acyl groups of saturated monocarboxylic acids (alkanoyl) preferably the formyl and acetyl groups. Advantageously R', R'' and R''' do not contain together more than a total of five carbon atoms and advantageously do not contain more than two carbon atoms each.

The imides of diamino-1,2,4-triazoles and maleic or citraconic acids themselves are readily prepared by reacting guanazole or a derivative thereof with maleic anhydride and thereafter effecting ring closure by heating alone or in the presence of acetic anhydride. For example guanazole maleic mono-imide is prepared by heating one mole proportion of guanazole with one mole proportion of maleic anhydride in the presence of ether and evaporating the ether to form the intermediate acid-amide whose structure is

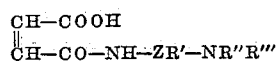

and then distilling this intermediate acid-amide to effect ring closure. This product can then be further reacted with maleic anhydride or maleic acid chloride by the same procedure to form the guanazole maleic di-imide which has the structure

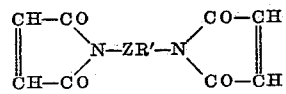

in which R' has the above-described significance. Except where crosslinking is not objectionable, however, the di-imide is advantageously avoided. Guanazole is readily prepared by refluxing an aqueous solution of dicyandiamide and a hydrazine salt, such as, the hydrochloride or sulfate and then neutralizing the acid. Substituted guanazoles are prepared by using substituted hydrazines, such as, phenyl-, tolyl-, or methyl-hydrazine instead of hydrazine and/or substituting appropriate alkyl or aryl biguanid for the dicyandiamide.

As an illustration, the maleic and citraconic mono-imides of guanazole of this invention and their polymer units may be represented by the following formulas respectively:

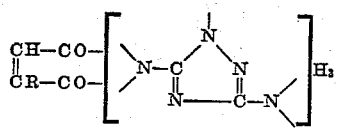

and

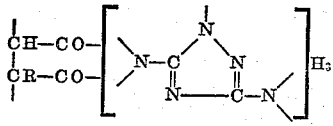

wherein R is hydrogen or a methyl group.

The proportions of the imide in the polymerization products of the invention may vary over a wide range, ranging from equimolar proportions of imide down to very small amounts of imide such as may be employed in acrylonitrile polymers to impart dye susceptibility thereto. Although even smaller amounts are somewhat effective, the improvement in susceptibility of acrylonitrile copolymers to dyes becomes particularly noticeable when the imide content of the copolymer is about 0.1 percent and the susceptibility increases as the amount of imide is increased. Ordinarily sufficient improvement in dye susceptibility is obtained with amounts of imide ranging up to about 10 or 15 percent but it may be advantageous for reasons such as in the preparation of ion-exchange polymers or as additives to improve dyeing properties to have a larger proportion of imide in the acrylonitrile copolymer. In such cases the concentration of imide may range up to or approaching 50 mole percent. Within these proportions acrylonitrile copolymers of the invention show great affinity toward many dyes especially acidic and vat dyes.

In addition to the improvements effected in the resulting copolymers, the use of the imides of diamino-1,2,4-triazoles and maleic or citraconic acids has certain other advantages over the use of the corresponding acids. For example, the imides are more soluble in acrylonitrile than the acids and therefore it is easier to get complete copolymerization of the amide with acrylonitrile in solution, emulsion and suspension polymerizations.

The acrylonitrile copolymers discussed herein are soluble in N,N-dimethyl acetamide (DMA), N,N-dimethyl formamide (DMF), butyrolactone, ethylene carbonate, N,N-dimethyl methyl urethane of the formula (CH$_3$)$_3$NCOOCH$_3$ ethylene carbamate, N-methyl-2-pyrrolidone, and a number of similar solvents, used alone or in conjunction with N,N-dimethyl cyanamide, N,N-dimethyl cyanoacetamide, N,N-dimethyl methoxy-acetamide, methylene dinitrile, methylene dithiocyanate, formyl caprolactam, formyl morpholine, tetramethylene sulfone, etc. Nitroalkanes, such as nitromethane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valence bonding strength, such as vinyl chloride, may often be dissolved in acetone or mixtures of acetone and solvents of the above types.

This invention will be more fully described by the following examples which illustrate methods of practicing the invention. In these examples and throughout the specification, "parts" and "percentages" are intended to mean parts by weight and percentages by weight.

*Example I*

20.2 grams (0.2 mol) guanazole is admixed with approximately 150 ml. diethyl ether and there is added slowly and with stirring 19.6 grams (0.2 mol) maleic anhydride. The mixture is refluxed for approximately ½ hour, cooled and the ether evaporated. There is obtained crude mono-acid amide of guanazole and maleic acid.

This product is admixed with 61.2 grams (0.6 mol) acetic anhydride and 6.1 grams (0.074 mol) sodium acetate and the mixture heated and refluxed with stirring for approximately ½ hour after which the mixture is cooled and poured slowly into a slurry of ice and water whereupon a precipitate forms. The precipitate is filtered and washed with water to remove acidic acid. The precipitate is dried in vacuum under phosphorous pentoxide and recrystallized from anhydrous benzene. There is obtained N-(amino-1,2,4-triazolyl) maleic imide.

Ultimate analyses for carbon, hydrogen and nitrogen and molecular weight determinations on the product give results which are in close agreement with the theoretical values for N-(amino-1,2,4-triazolyl) maleic imide.

Substitution of equivalent quantities of polymerizable ethenedioic acid anhydrides or diamino 1,2,4-triazoles respectively in the foregoing procedure for maleic anhydride and guanazole yields the various N-(amino-1,2,4-triazolyl) ethendioic imides of this invention which are characterized by ultimate analyses and molecular weight determinations as in the foregoing procedure.

*Example II*

Five polymers of acrylonitrile are prepared from the following monomer compositions

| Polymer | Acrylonitrile, parts | Guanazole maleic mono-imide, parts |
|---|---|---|
| A | 100 | |
| B | 99.9 | 0.1 |
| C | 95 | 5.0 |
| D | 90 | 10.0 |
| E | 80 | 20.0 |

To 900 parts of water, adjusted to a pH of about three, in a suitable reactor, is added 1.0 part of ammonium persulfate, 0.5 part of sodium bisulfite, and 100 parts of monomer or monomer mixture. The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer isolated by filtration.

The polymer is then washed with water and with methyl alcohol. A portion of the polymer is dissolved in dimethyl formamide or butyrolactone and a film cast from the solution. The film is washed entirely free of solvent and stretched at a ratio of about 8:1 in a glycerine bath containing for each part of film 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 percent coal solution at 85° C. Whereas the unmodified polyacrylonitrile when treated in this manner had little or no color, all of the copolymers are dyed to a deep blue shade.

Fibers are spun from the same solutions either by dry spinning, or by wet spinning. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, tetramethyl urea, butyrolactone, ethylene carbonate, formyl morpholine, etc.

Example III

Five parts of the copolymer fiber C of Example II is dyed to a green shade using the vat color, dimethoxydibenzanthrone, at 70° C. in a bath containing 0.5 part of dye, 0.2 part sodium hydroxide, 0.5 part sodium hydrosulfite and 100 parts of water (20:1 bath-fiber ratio). After the first 15 minutes of heating, 0.25 part of Glauber's salt is added. The sample is then oxidized in a 0.5 percent sodium dichromate 1.0 percent acetic acid aqueous at 70° C. for 30 minutes in a 20:1 bath-fiber ratio. The dyed fiber is then scoured in a boiling 0.5 percent soap solution. A sample of yarn prepared from the unmodified acrylonitrile polymers and dyed under the same conditions acquires only a light shade of color.

When 1,5 - di-p-anisoylamino - 4,8 - dihydroxyanthraquinone is used as the vat dye, the copolymer fiber is dyed a strong violet color.

Example IV

The procedure of Example II is repeated for the polymerization of the following monomer compositions

| Polymer | Acrylonitrile, parts | Vinyl Chloride, parts | Guanazole maleic mono-imide, parts | Copolymer Soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO$_2$Me. |
| E | 57 | 40 | 3 | NO$_2$Me. |
| F | 37 | 60 | 3 | Acetone. |

Sometimes copolymers D and E, when dissolved in nitromethane may have gelled, partially dissolved particles known as fisheyes. In such cases, the solubility can be improved by the addition of small amounts of materials which are good solvents for acrylonitrile polymers, such as butyrolactone, ethylene carbonate, dimethyl formamide, dimethyl acetamide, tetramethyl urea, etc. In addition, certain materials which are relatively poor solvents for polyacrylonitrile, such as diethyl formamide, diethyl acetamide, diethyl propionamide, etc., can be added to improve the solubility. Also, when acetone solutions of copolymer F contain gelled particles, clarification of the solution can be effected by the addition of nitromethane, diethyl formamide, diethyl acetamide, etc.

Dyeing tests of these copolymers show improvements in dyeing susceptibility similar to those of Example II.

Example V

The procedure of Example II is repeated for the polymerization of the following monomer compositions

| Polymer | Acrylonitrile, parts | Styrene, parts | Guanazole maleic mono-imide, parts |
|---|---|---|---|
| A | 88 | 7 | 5.0 |
| B | 78 | 17 | 5.0 |
| C | 68 | 27 | 5.0 |
| D | 58 | 37 | 5.0 |

Dyeing tests of these copolymers show improvements in dye susceptibility similar to Example II. In place of styrene, various styrene derivatives can be used, such as alpha-methyl-styrene; nuclear-substituted chloro-styrenes, i. e., ortho-, meta-, and para-chloro-styrenes, dichloro-styrenes, for example, the 2,3-, 2,4-, 2,5-, 2,6-, 3,4-, and 3,5-dichloro-styrenes, trichloro-styrenes; cyano-styrenes, such as ortho-, meta-, and para-cyano-styrenes, dicyano-styrenes; nuclear-substituted alkyl-styrenes, such as mono- and di-methyl-styrenes, mono- and di-ethyl styrenes, mono- and di-isopropyl-styrenes; aryl substituted styrenes, i. e., para-phenyl-styrene, etc., cycloaliphatic-substituted styrenes, such as para-cyclohexyl-styrene; fluoro-styrenes, such as ortho-, meta-, para-fluoro-styrene, difluoro-styrenes, etc.; trifluoro-methyl-styrenes, such as ortho-, meta-, and para trifluoromethyl-styrenes, di-(trifluoromethyl)-styrenes, and various other styrenes or mixtures of any number of these with each other or with styrene.

Example VI

The procedure of Example II is repeated for the polymerization of the following monomer compositions

| Polymer | Acrylonitrile, parts | Vinyl-Chloride, parts | 1-phenyl-guanazole maleic mono-imide, parts | Copolymer Soluble in— |
|---|---|---|---|---|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total acrylonitrile and vinylidene chloride of at least 85 percent in the polymer molecules, only the more active solvents, such as butyrolactone, ethylene carbonate, N,N-dimethyl acetamide, N,N-dimethyl formamide, N,N,N',N'-tetramethyl urea, etc., can be used as solvents. The above copolymers dye more readily and thoroughly than similar copolymers containing no imide.

Example VII

The procedure of Example II is repeated for the polymerization of the following monomer compositions

| Polymer | Acrylonitrile, parts | Vinylidene Chloride, parts | Vinyl Chloride, parts | Guanazole citraconic mono-imide, parts |
|---|---|---|---|---|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example II.

Instead of copolymerizing the diamino-1,2,4-triazole imides of maleic or citraconic acids directly with the acrylonitrile, the imides can be first copolymerized with part of the acrylonitrile or with another monomer and this independently prepared copolymer used to modify polyacrylonitrile or acrylonitrile copolymers. These modifying-copolymers can be prepared substantially in accordance with the procedure of Example II and thereafter placed in solution and added to a solution of polyacrylonitrile, so that a composition consisting of sufficient polymeric diamino-1,2,4-triazole imide results and satisfactory dyeing is obtained. As examples, polymers D and E of Example II can be used as modifiers for the unmodified homopolymers and copolymers of acrylonitrile. For example, polymer E of Example II, which consists of 80 parts of acrylonitrile and 20 parts of guanazole maleic mono-imide has excellent compatibility with homopolymers of acrylonitrile. In many cases, it is desirable to use the copolymers of the diamino-1,2,4-triazole imide, which have even a higher ratio of the imide, for example, as high as equal molar parts of the imide can be copolymerized with acrylonitrile or methacrylonitrile. Suitably from 10 to 15 to about 70 percent imide may be used. The overall amounts of imide required to improve the dyeability generally corresponds to the amounts indicated above for copolymers in which the main body of the acrylonitrile polymers contain the imide copolymerized directly therein, that is, from at least about 0.1 percent to advantageously 5 percent or even 15 percent imide in the ultimate polymer mixture. The copolymers of these imides with other monomers are satisfactory such as, for example, copolymers of styrene, alpha-methyl-styrene, methyl acrylate, ethyl methacrylate, etc.

When it is desired to modify an acrylonitrile copolymer such as the copolymer of acrylonitrile and styrene or the copolymers of acrylonitrile and other copolymerizable ethylenic compounds, it is usually desirable to use as modifiers copolymers containing at least one structural unit present in the acrylonitrile copolymer. Thus as there are present in the acrylonitrile copolymer, structural units derived from the acrylonitrile and styrene, it is desirable to have present in the modifying copolymer structural units derived from styrene and/or acrylonitrile, advantageously both, in addition to those derived from the imide. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the present invention have in the polymer molecule a plurality of repeating units of the formula

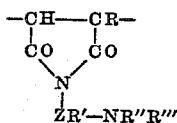

in which R, R', R", R''', and Z are as indicated above and will contain additional repeating units of the formula

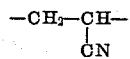

when the imide is copolymerized with acrylonitrile.

In addition, the copolymers can contain any number of repeating units of the type obtained by the copolymerization of the imides of the invention or a mixture of acrylonitrile and the imide with one or more copolymerizable ethylenic compounds, such as, for example, vinylidene chloride, vinyl chloride, styrene, alpha-methyl-styrene and methacrylonitrile. When the polymerization mass contains in addition to the imide a polymerizable monomer having a $CH_2=C<$ group in an amount such that the latter monomer is present to an extent of at least 50 mole percent of the overall monomer content, then such monomers as fumaronitrile, beta-cyano-acrylamide and methyl beta-cyano-acrylate can also be present in the polymerization mixture.

As previously indicated, the solvent resistance of such copolymers as contain one or more monomer units in addition to those formed by the acrylonitrile and the imides of the invention is effected by the type and proportion of copolymerizing monomer or monomers used to replace part of the acrylonitrile. For example, copolymers containing small amounts of the imide units may contain various proportions of such monomer units as obtained from vinylidene chloride, methacrylonitrile, fumaronitrile, and beta-cyano-acrylamide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example, the tensile strength of an acrylonitrile-imide type copolymer will decrease much more when a monomer having relatively weak secondary bonding forces, such as styrene or ethylene is used to replace part of the acrylonitrile than when one or more monomers having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which can also be present in the polymerizable masses for copolymerization with the imides used in the practice of this invention include one or more of the following: acrylates, e. g. methyl acrylate; methacrylates, e. g. methyl methacrylate; acrylamides, methacrylamides; vinyl esters, such as vinyl acetate; itaconic diesters, such as dimethyl and diethyl itaconates; itaconamide; vinyl halides, such as vinyl fluoride, vinylidene fluoride, tetrafluoroethylene, trifluorochloroethylene, vinyl aryls, such as vinyl naphthalenes and the nuclear-substituted styrenes listed in Example V, etc.

The polymerization products of this invention can be prepared by various polymerization systems, such as emulsion, suspension, mass and solution polymerizations. In addition to the monomers, the polymerizable mass can also contain other materials such as catalysts, e. g. peroxides, such as benzoyl peroxide, naphthyl peroxides, phthalyl peroxide, tertiary-butyl hydro-peroxide, hydrogen peroxide, cyclohexyl hydroperoxide, tertiary-butyl perbenzoate, etc., azo catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weight less than 10,000 can be used for other purposes, such as impregnate, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is a non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc., can be used as a precipitating bath for N,N-dimethyl acetamide, N,N,N',N'-tetramethyl urea, butyrolactone, ethylene carbonate, and other solvent compositions of these copolymers. The extruded fibers, from which substantially all of the solvent has been removed in the spinning step, about 1–10 percent remaining in the shaped article, can then be cold-drawn about 100–900 percent, preferably about 300–600 percent; and the drawn fiber heat-treated, usually at substantially constant length, at about 100–160° C. to effect further crystallization and removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent of imide in the copolymer molecule. This is true when the major portion of the copolymer is acrylonitrile, for example 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and an imide according to the invention, the proportion of acrylonitrile in the copolymers may be much less than 85 percent without destroying the capacity for molecular orientation. Molecularly oriented, cold-drawn shaped articles of particular usefulness are prepared from copolymer compositions containing in the polymer molecules 60–99.9 percent acrylonitrile, 0.1 to 15 percent, advantageously 0.1–5 percent, the imide, with or without one or more monomers of the class consisting of vinylidene chloride, vinyl chloride, styrene, alpha-methyl-styrene, methacrylonitrile, fumaronitrile, beta-cyano-acrylamide and methyl beta-cyano-acrylate, the effects of the presence of the monomers of this class being noticeable when the monomer is present in the polymer molecule in amounts of one percent or more.

The polymerization products of this invention show great affinity for the acetate, acidic and vat dyes. The cellulose acetate dyes which are effective with these polymerization products are mainly amino anthraquinone derivatives. A number of other acidic dyes that can be used are anthranilic acid→1-(4'-sulfophenyl)-3-methyl-5-pyrazolone; 1,5-diamino-4,8-dihydroxyanthraquinone-3-sulfonic acid; 1-aminonaphthalene-4-sulfonic acid→alpha-naphthol-4-sulfonic acid; the sodium salt of sulfanilic acid→aniline→2-benzoyl-amino-5-naphthol-7-sulfonic acid; the sodium salt of 4,4'-diaminostilbene-2,2'-disulfonic acid⇉(phenol)₂ ethylated; 1,5-diamino-4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (m-amino-benzoic acid→o-anisidine) phosgonated; the sodium salt of (2-naphthol-6,8-disulfonic acid←benzidine→phenol) ethylated; dimethoxydibenzanthrone; and 1,5-di-p-anisoylamino-4,8-dihydroxyanthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in the order of 4 to 6 grams per denier. Moreover, these properties make the fibers desirable in the manufacture of hosiery and for such all-purpose fabrics as used for blouses, shirts, suits, etc.

This application is a continuation in part of my application Serial No. 244,703, filed August 31, 1951, now abandoned.

What is claimed is:
1. As a new monomeric composition of matter, a compound having the formula

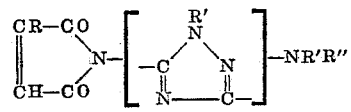

in which R is selected from the class consisting of hydrogen and methyl; R' is selected from the class of hydrogen and alkyl; and R" is selected from the class consisting of hydrogen, alkyl, and carboxylic acyl.

2. As a new monomeric composition of matter, a compound having the formula

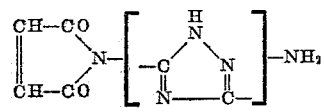

3. As a new monomeric composition of matter, a compound having the formula

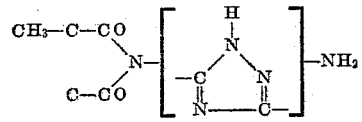

4. As a new monomeric composition, N-(amino-1,2-4-triazolyl) maleimide.

5. As a new monomeric composition, N-(amino-1,2,4-triazolyl) citraconicimide.

6. A copolymer of a mono-imide of guanazole and maleic acid and a polymerizable monomer having a $CH_2=C<$ group, selected from the class consisting of acrylonitrile, vinyl chloride, vinylidene chloride, styrene, alpha-methyl-styrene, and methacrylonitrile.

7. The polymeric composition of claim 6 in which the polymerizable monomer is present in an amount corresponding to at least 50 percent by weight of the composition, said composition containing an additional polymerizable monomer selected from the group consisting of fumaronitrile, beta-cyano-acrylamide, and methyl beta-cyano-acrylate.

8. As a new polymeric composition a copolymer of a monomeric composition having the formula

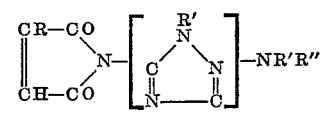

in which R is selected from the class consisting of hydrogen and methyl; R' is selected from the class consisting of hydrogen and alkyl; and R" is selected from the class consisting of hydrogen, alkyl, and carboxylic acid, and a polymerizable monomer having a $CH=C<$ group selected from the group consisting of acrylonitrile, vinyl chloride, vinylidene chloride, styrene, alpha-methyl-styrene, and methacrylonitrile.

9. The copolymer of claim 8 in which the polymerizable monomer is present in an amount corresponding to at least 50 percent by weight of the composition and an additional polymerizable monomer selected from the group consisting of fumaronitrile, beta-cyano-acrylamide, and methyl beta-cyano-acrylate.

10. A polymeric composition having in the polymer molecule a plurality of repeating acid reactive units having the formula

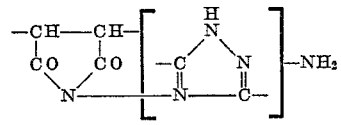

and a plurality of repeating units of the formula

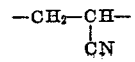

11. A cold-drawn shaped article having molecular orientation and susceptibility to acid dyes, said article comprising a copolymer of acrylonitrile and an imide as defined in claim 1.

12. A cold-drawn fiber having molecular orientation and dye susceptibility to acid dyes, said fiber comprising a copolymer of acrylonitrile and the mono-imide of guanazole and maleic acid, said copolymer having a molecular weight of at least about 10,000 and containing in the polymer molecule no more than about 15 percent by weight of said imide.

13. A cold-drawn fiber having molecular orientation and dye susceptibility to acid dyes, said fiber comprising a copolymer of about 60–98.9 percent by weight acrylonitrile, about 0.1 to 5 percent by weight the mono-imide of guanazole and maleic acid, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl beta-cyano-acrylate.

14. A cold-drawn fiber having molecular orientation and dye susceptibility to acid dyes, said fiber comprising a copolymer of about 60–98.9 percent by weight acrylonitrile, about 0.1 to 5 percent by weight the mono-imide of guanazole and maleic acid, and about 1 to 39.9 percent by weight vinylidene chloride.

15. A cold-drawn fiber having molecular orientation and dye susceptibility to acid dyes, said fiber comprising a copolymer of about 60–98.9 percent by weight acrylonitrile, about 0.1 to 5 percent by weight the mono-imide of guanazole and maleic acid, and about 1 to 39.9 percent by weight vinyl chloride.

16. A cold-drawn fiber having molecular orientation and dye susceptibility to acid dyes, said fiber comprising a copolymer of about 60–98.9 percent by weight acrylonitrile, about 0.1 to 5 percent by weight the mono-imide of guanazole and maleic acid, and about 1 to 39.9 percent by weight styrene.

17. A cold-drawn fiber having molecular orientation and dye susceptibility to acid dyes, said fiber comprising a copolymer of about 60–98.9 percent by weight acrylonitrile, about 0.1 to 5 percent by weight an imide as defined in claim 1.

18. A cold-drawn shaped article having molecular orientation and dye susceptibility to acid dyes, said article comprising a copolymer of about 60–98.9 percent by weight acrylonitrile, about 0.1 to 5 percent by weight an imide as defined in claim 2.

References Cited in the file of this patent

UNITED STATES PATENTS 2,643,990     Ham                 June 30, 1953